United States Patent
Tanaka et al.

(10) Patent No.: US 6,815,864 B2
(45) Date of Patent: *Nov. 9, 2004

(54) AC GENERATOR

(75) Inventors: Katsunori Tanaka, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/839,209

(22) Filed: Apr. 23, 2001

(65) Prior Publication Data

US 2002/0011757 A1 Jan. 31, 2002

(30) Foreign Application Priority Data

Jul. 25, 2000 (JP) ........................................ 2000-223896

(51) Int. Cl.⁷ ......................... H02K 19/22; H02K 21/22; H02K 5/00
(52) U.S. Cl. .............. 310/263; 310/156.21; 310/156.31
(58) Field of Search .............................. 310/43, 91, 263, 310/156.31, 156.21; 29/596–598

(56) References Cited

U.S. PATENT DOCUMENTS

| | | | | |
|---|---|---|---|---|
| 3,445,694 A | * | 5/1969 | Campbell et al. | 310/263 |
| 4,700,093 A | * | 10/1987 | Negishi | 310/89 |
| 5,021,696 A | * | 6/1991 | Nelson | 310/62 |
| 5,424,591 A | * | 6/1995 | Kuriyama | 310/12 |
| 5,684,352 A | * | 11/1997 | Mita et al. | 310/156 |
| 5,698,918 A | * | 12/1997 | Shinoda et al. | 310/89 |
| 5,705,970 A | * | 1/1998 | Nishida et al. | 335/303 |
| 5,708,318 A | * | 1/1998 | Fudono | 310/263 |
| 5,779,453 A | * | 7/1998 | Nagayama et al. | 417/410.4 |
| 5,793,143 A | * | 8/1998 | Harris et al. | 310/263 |
| 5,800,728 A | * | 9/1998 | Iwata | 148/301 |
| 5,801,470 A | * | 9/1998 | Johnson et al. | 310/156 |
| RE36,038 E | * | 1/1999 | Nakamura et al. | 310/65 |
| 5,903,083 A | * | 5/1999 | Mukai et al. | 310/263 |
| 5,903,084 A | | 5/1999 | Asao et al. | 310/263 |
| 6,051,077 A | * | 4/2000 | Sekine et al. | 148/105 |
| 6,144,138 A | * | 11/2000 | Ragaly | 310/263 |
| 6,172,433 B1 | * | 1/2001 | Asao | 310/62 |
| 6,291,918 B1 | * | 9/2001 | Umeda et al. | 310/263 |
| 6,333,582 B1 | * | 12/2001 | Asao et al. | 310/263 |
| 6,369,471 B1 | * | 4/2002 | Whitted et al. | 310/62 |

FOREIGN PATENT DOCUMENTS

| | | | | |
|---|---|---|---|---|
| JP | 405211741 A | * | 8/1993 | 310/67 R |
| JP | 11-136913 | | 5/1999 | H02K/19/22 |

OTHER PUBLICATIONS

Abstract of Japan 11136913 A May 21, 1999.

* cited by examiner

Primary Examiner—Tran Nguyen
(74) Attorney, Agent, or Firm—Sughrue Mion, PLLC

(57) ABSTRACT

An ac generator comprising a rotor coil for generating a magnetic flux, a pole core disposed to cover the rotor coil and having pawl-shaped magnetic poles projecting in staggered and alternating relationship, permanent magnets disposed on both side surfaces of the pawl-shaped magnetic poles for reducing the leakage of the magnetic flux, and a fan for cooling. The permanent magnets are samarium-iron alloy magnets containing Ti and B, or plastic magnets made of magnet powder bonded together by a resin, bonded magnets of $Sm_{8.2}$—$Fe_{75.6}$—$Ti_{2.3}$—$B_{0.9}$—$N_{13}$. One portion of the side opposing to the pawl-shaped magnetic pole side surfaces of the permanent magnet may be resin-coated. A restricting means for restricting the displacement of the magnetic pole in the radial direction may be disposed in the vicinity of the tips of the magnetic poles.

7 Claims, 11 Drawing Sheets

FIG. 3

| thermal stability of bond magnet | temperature coefficient of residual magnetic flux density (%/K) | non-reversible demagnetizing factor 2 hours (%) | non-reversible demagnetizing factor 300 hours (%) |
|---|---|---|---|
| Sm-Fe-Ti-B-N bond magnet | -0.06 | -2.1 | -2.5 |
| Sm-Fe-N bond magnet | -0.07 | -4.0 | -5.3 |
| Nd-Fe-Co-B bond magnet | -0.10 | -4.4 | -5.4 |

AC GENERATOR

This application is based on Application No. 2000-223896, filed in Japan on Jul. 25, 2000, the contents of which are hereby incorporated by reference.

BACKGROUND OF THE INVENTION

This invention relates to an ac generator and, more particularly, to a vehicular alternating current generator driven by an engine.

FIG. 12 is a sectional side view showing one example of a conventional vehicular ac generator. As shown in FIG. 12, the generator comprises a case 3 composed of a front bracket 1 and a rear bracket made of aluminum, a shaft disposed within the case 3 and having a pulley 4 secured to one end portion, a, Randell-type rotor 7 secured to the shaft 6, a fan 5 fixed to the opposite ends of the rotor 7 and a stator 8 secured to an inner surface of the case 3.

The generator further comprises a slip ring 9 attached to the other end of the shaft 6 for supplying an electric current to the rotor 7, a pair of brushes 10 sliding on the slip ring 9, a brush holder 11 housing the brushes 10 therein, a rectifier 12 electrically connected to the stator 8 for rectifying an alternating current generated in the stator 8 into a direct current, a heat sink 19 fitted over the brush holder 11 and a regulator 20 attached to the heat sink 19 and regulating the magnitude of the ac voltage generated in the stator 8. The front bracket 1 and the rear bracket 2 each has an exhaust window 17 which serves as a ventilation port for a cooling wind.

The rotor 7 comprises a cylindrical rotor coil 13 through which an electric current flows for generating magnetic fluxes and a pole core 14 disposed to cover the rotor coil 13 for generating a magnetic core.

The stator 8 comprises a stator core 15 and a stator coil 16 wound on the stator core 15 and generating an alternating current due to the change in magnetic fluxes from the rotor coil 13 upon the rotation of the rotor 7.

The pole core 14 comprises a pole core member 22 including a pair of first pole core member 21 and a second pole core member 22 meshing with each other. The pole core member 21 and the pole core member 22 are usually made of iron and comprises cylindrical portions 21e and 22e to which the rotor coil 13 is wound and base portions 21k and 22k from which the cylindrical portions 21e and 22e are projected. Disposed respectively at the outer edges of the base portions 21k and 22k and between the outer circumference of the rotor coil 13 and the inner circumference are plurality of paw-like magnetic poles 23 and 24 meshing with each other.

The pawl-like magnetic poles 23 and 24 have a large thickness and width at the base 21k and 22k and smaller thickness and width toward the tip end. The inner circumferential surfaces 23a and 24a of the pawl-like magnetic poles 23 and 24 have thinner thickness at the tip portion and the outer circumferential surfaces 23b and 24b are curved in an arc along the inner circumferential surface of the stator 8. The pawl-like magnetic poles 23 and 24 have two trapezoidal side surfaces 23c and 24c in relation to the circumferential direction of the rotor 7. Since the respective pawl-like magnetic poles 23 and 24 are placed in an alternatingly meshing relationship with their tip opposing to each other, the inclined faces of the inner circumferential surfaces 23a and 25a of the pawl-like magnetic poles 23 and 24 are arranged in a circumferential raw in a alternating relationship. Also, the side surfaces 23c and 24c of the pawl-like magnetic poles 23 and 24 are inclined toward the centers of the pawl-like magnetic poles 23 and 24 so that they become gradually thinner at the tip portion than at the root portion.

Secured between the adjacent pawl-like magnetic poles 23 and 24 are permanent magnets 30A of a substantially rectangular parallelepiped configuration so magnetized that reduces the leakage of the magnetic flux between the opposing side surfaces 23c and 24c.

The operation will now be described. When an electric current is supplied to the rotor coil 13 from the unillustrated battery through the brush 10 and the slip ring 9, a magnetic flux is generated to magnetize the pawl-like magnetic pole 23 of the first pole core member 21 into the N pole and the pawl-like magnetic pole 24 of the second pole core member 22 into the S pole. On the other hand, the engine rotates the pulley 4 and the shaft 6 rotates the rotor 7, so that an alternating electromotive force is generated at the stator coil 16. This alternating electromotive force is regulated into a direct current through the rectifier 12 and is regulated at its magnitude by the regulator 20, thereby to charge the unillustrated battery.

The magnet 30A of a substantially rectangular parallelepiped configuration secured between the pawl-like magnetic poles 23 and 24 is a plastic magnet. As for the magnet material, a ferrite magnet is advantageous from the viewpoint of cost, but this material is seldom used because of the mechanical brittleness, the low magnetizable residual magnetic flux density and the heat sensitive properties. Therefore, as for the magnet material, because of the advantages of the large degree of freedom in the magnet configuration and the high residual magnetic flux density, plastic magnet is often utilized. As for the plastic magnet, neodymium-iron-born group (Nd—Fe—Co—B bond magnet) and Samarium-iron group (Sm—Fe—N bond magnet) have been used.

The temperature coefficient of the residual magnetic flux density Br of the Nd—Fe—Co—B bond magnet is −0.1%/K (negative temperature coefficient) and the temperature coefficient of the residual magnetic flux density of the Sm—Fe—N bond magnet is −0.07%/K (negative temperature coefficient), so that the magnet effect is reduced to lower the generator output when the ac generator is at an elevated temperature condition.

Generally, a typical magnet exhibits the phenomenon of the nonreversible demagnetizing, in which phenomenon the magnetic flux (magnetic force) does not recover to the initial property value after the magnet heated to an elevated temperature is returned to the room temperature, and such the rate of change is referred to as the non-reversible demagnetizing factor. Here, the non-reversible demagnetizing factor where the magnet is heated to 373K and the heating time is 2 hours is referred to as 2-hour non-reversible demagnetizing factor, and the one that the heating time is 300 hours is referred to as 300-hour non-reversible demagnetizing factor, then the 2-hour non-reversible demagnetizing factor (373K×2 hr) of the Nd—Fe—Co—B bond magnet is −4.4% and the 300-hour non-reversible demagnetizing factor (373K×300 hr) is −5.4%. The 2-hour non-reversible demagnetizing factor (373K×2 hr) of the Sm—Fe—N bond magnet is −4.0% and the 300-hour non-reversible demagnetizing factor (373K×300 hr) is −5.3%. Therefore, when the ac generator is continuously used at an elevated temperature, the magnetic property of the magnet is deteriorated and the power of the ac generator is decreased as compared to that at the initial value.

On the other hand, the oxygen content of the Nd—Fe—Co—B magnetic powder after heating (373K×300 hr) is 0.8 wt % and the oxygen content of Sm—Fe—N magnetic powder after heating (373K×300 hr) is 0.4 wt %. The larger the oxygen content, the more easily rust is generated on the magnetic powder and the magnetic poles due to the ingress of moisture or the like. When the rust is generated, the magnet strength and the bonding strength between the magnetic poles and the magnet is decreased, significantly reducing the rotor strength at a high speed rotation. Particularly, the oxygen content of the Nd—Fe—Co—B bond magnet is as high as twice of that of the Sm—Fe—N bond magnet and is inferior in the oxygen-resistance, so that the surface treatment such as an epoxy coating or plating is necessary and costly.

Accordingly, an object of the present invention is to provide an ac generator that is inexpensive and the ac generator output power does not decrease even during the high temperature operation and that the rotor strength at a high speed rotation is sufficiently large.

SUMMARY OF THE INVENTION

The present invention resides in an ac generator comprising a stator and a rotor, and the stator is disposed within a bracket having an exhaust window and generating a three-phase ac current by a rotating field of the rotor. The rotor comprises a rotor coil for generating a magnetic flux, a pole core composed of first and second pole core members disposed so as to cover the rotor coil and having pawl-shaped magnetic poles projecting in staggered and alternating relationship, a plurality of permanent magnets disposed on both side surfaces of the pawl-shaped magnetic poles for reducing the leakage of the magnetic flux between the side surfaces of the adjacent pawl-shaped magnetic poles, and a fan mounted to each of opposite axial ends of the rotor for cooling a heat-generating member heated due to a generator output current. The permanent magnets are permanent magnets of samarium-iron alloy containing Ti and B.

The permanent magnets may be plastic magnets made of magnet powder bonded together by a resin, bonded magnets of $Sm_{8.2}$—$Fe_{75.6}$—$Ti_{2.3}$—$B_{0.9}$—$N_{13}$, which may be supported by corrosion-resistive holding members surrounding the magnet or which may be independently attached to each of the magnetic poles of the first and second pole core members.

At least one portion of the side opposing to the pawl-shaped magnetic pole side surfaces of the permanent magnet may be resin-coated.

The first and second pole core members may have on their outer circumferences restricting means for restricting the displacement of the magnetic pole in the radial direction due to a centrifugal force during the rotor rotation, and the restricting means may be disposed in the vicinity of the tips of the magnetic poles of the first and second pole core members to restrict the displacement of the pole tips. The restricting means may be corrosion-resistant annular member s circumferentially extending over the entire circumference of the rotor.

BRIEF DESCRIPTION OF THE DRAWINGS

The present invention will become more readily apparent from the following detailed description of the preferred embodiments of the present invention taken in conjunction with the accompanying drawings, in which:

FIG. 3 is a table showing the stability to heat of the permanent magnet by the temperature coefficient of the residual magnetic flux density and the nonreversible demagnetizing factor;

DESCRIPTION OF THE PREFERRED EMBODIMENTS

Figure 1:
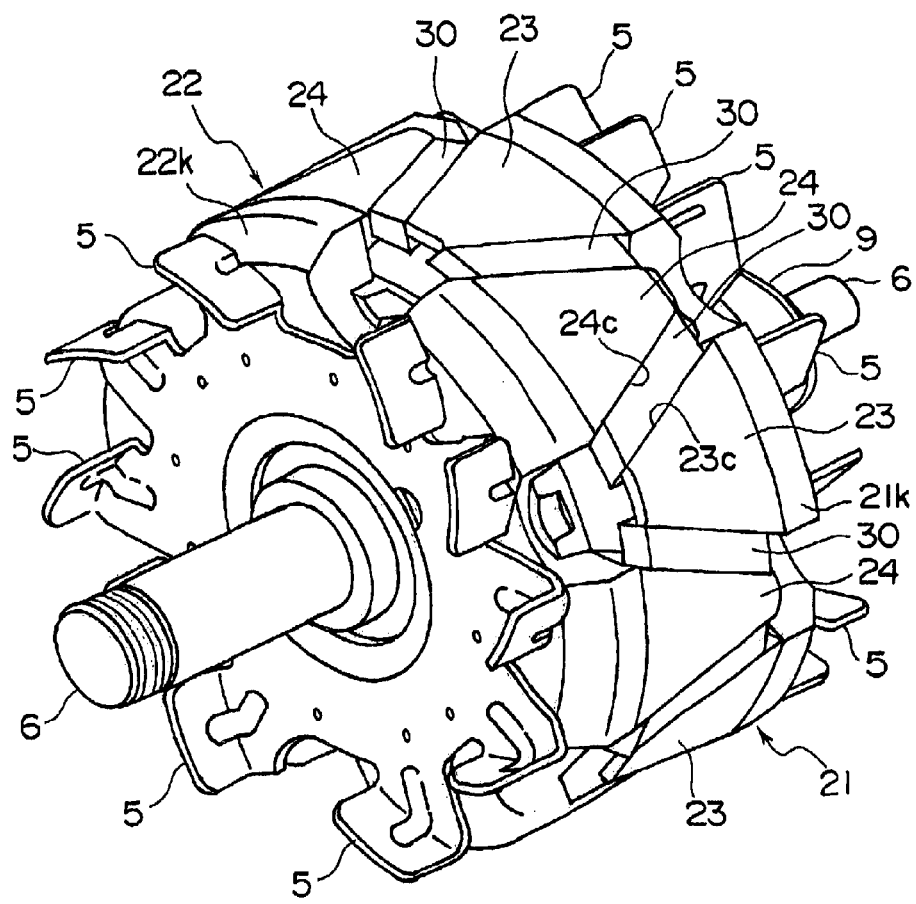
FIG. 1 is a perspective view of the rotor of the ac generator of the present invention.
Figure 2:
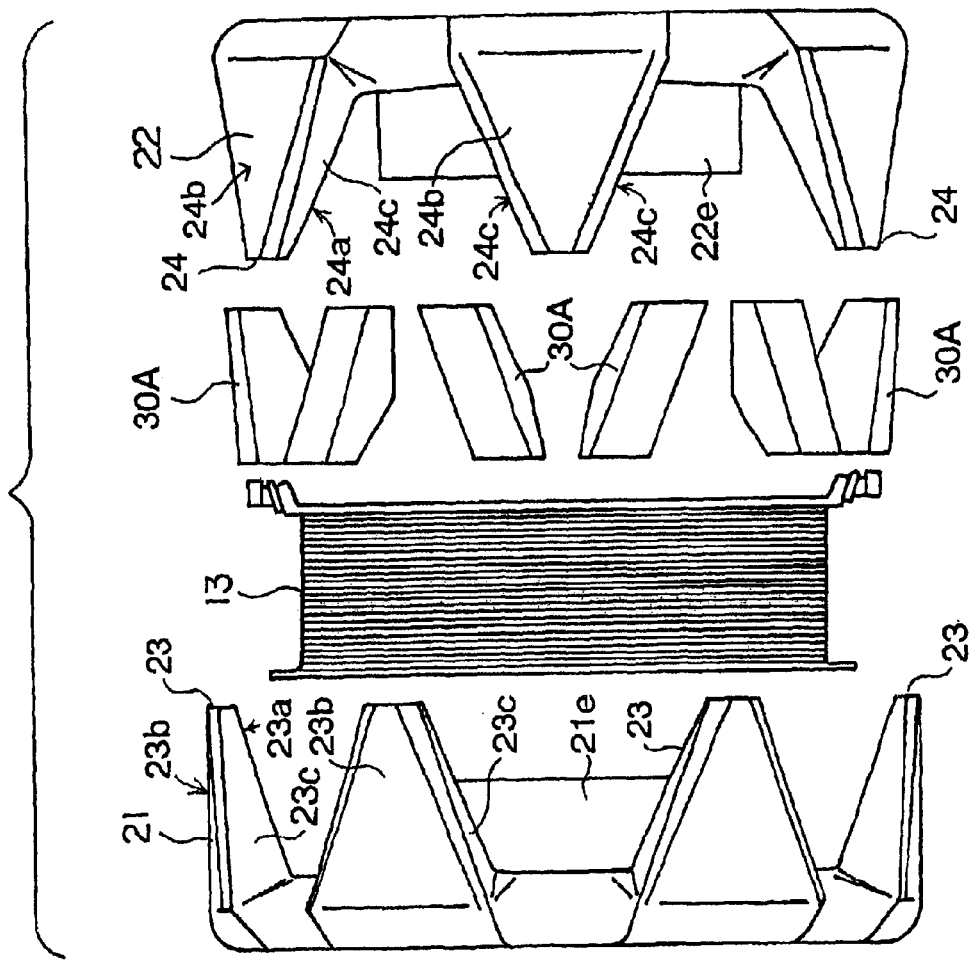
FIG. 2 is an exploded side view showing the relationship between the rotor coil and the pole cores of the the ac generator of the present invention.
Figure 12:
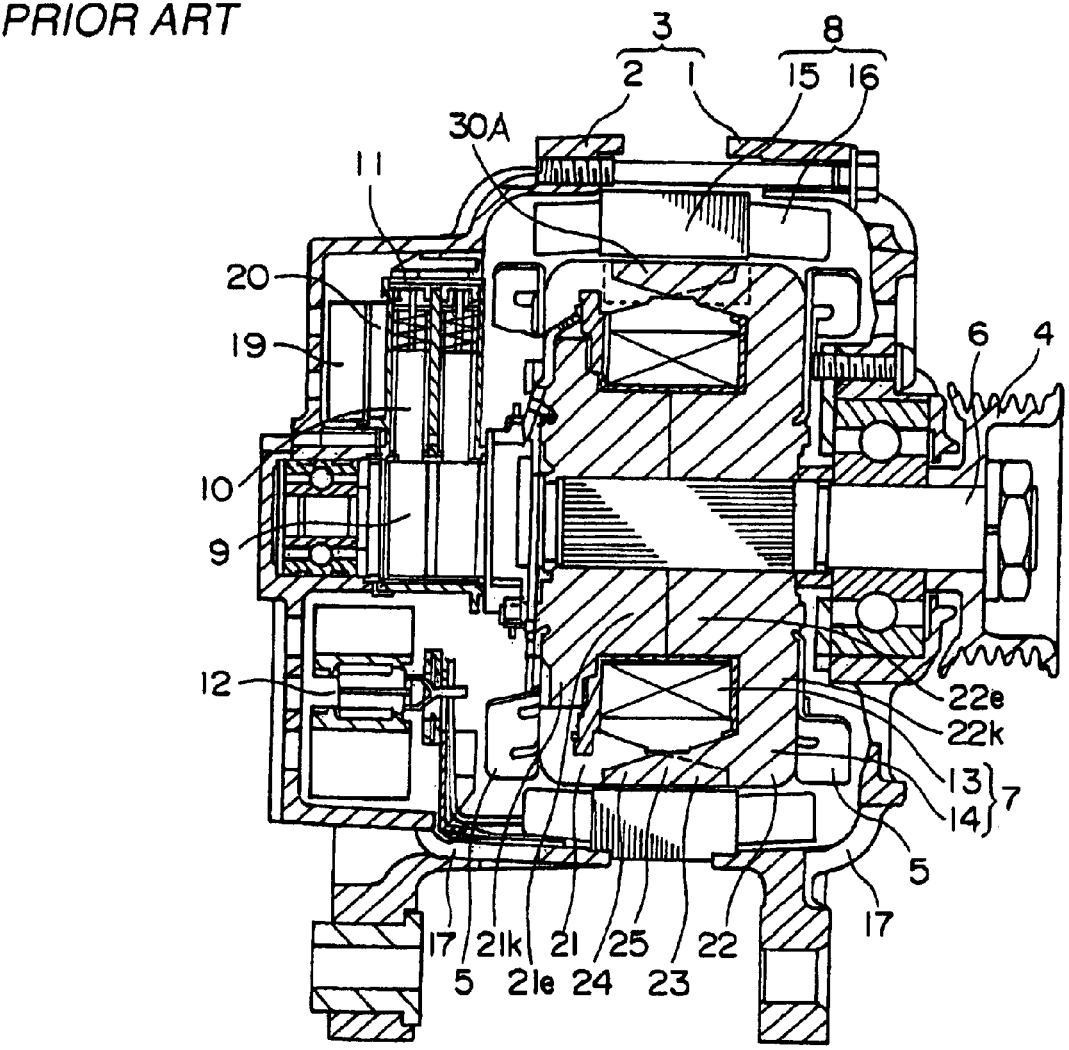
FIG. 12 is a sectional side view showing ac generator to which the present invention can be applied.

FIG. 1 is a perspective view of the rotor of the ac generator of the present invention and FIG. 2 shows the relationship between the rotor coil and the pole cores of the ac generator of the present invention in an exploded side view. The overall structure of the ac generator of the present invention is similar to the conventional ac generator illustrated in FIG. 12, the difference being a rectangular parallelepiped permanent magnet 30 that is secured between adjacent pawl-shaped magnetic poles 23 and 24 and is magnetized in the direction reducing the leakage of the magnetic flux between the opposing side surfaces 23c and 24c of the adjacent pawl-shaped magnetic poles 23 and 24. That is, according to the present invention, the permanent magnets 30 secured between the pawl-shaped magnetic poles 23 and 24 are plastic magnets of samarium-iron alloy containing Ti and B in the composition (bonded magnets of Sm—Fe—Ti—B—N). An example of such the permanent magnets 30 is a bonded magnet of $Sm_{8.2}$—$Fe_{75.6}$—$Ti_{2.3}$—$B_{0.9}$—N.

FIG. 3 is a table showing the temperature coefficient of the residual magnetic flux density and the non-reversible demagnetizing factor which is a rate of change of the magnetic flux (magnetic force) property value with respect to the initial value when the temperature is returned to room temperature from an elevated temperature for the case where the magnet is heated to 373K for 2 hours (2 hour non-reversible demagnetizing factor) and for the case where the magnet is heated to 373K for 300 hours (300 hour non-reversible demagnetizing factor) in comparison with those of the conventional bond magnet. From FIG. 3, the temperature coefficient of the residual magnetic density Br of the conventional Nd—Fe—Co—B bond magnet ($Nd_{12}$—$Fe_{76}$—$Co_5$—$B_7$ bond magnet, for example) is −0.10%/K (negative temperature coefficient), and similarly, the temperature coefficient of the residual magnetic density Br of the conventional Sm—Fe—N bond magnet ($Sm_{9.0}$—$Fe_{78.0}$—$N_{13}$ bond magnet, for example) is −0.07%/K (negative temperature coefficient), so that, when the ac generator is heated to an elevated temperature, the residual magnetic flux density Br becomes small, thus decreasing the effect of reducing the leakage of the magnetic flux and the generator power is decreased. The temperature coefficient of the residual magnetic flux density Br of Sm—Fe—Ti—B—N bond magnet ($Sm_{8.2}$—$Fe_{75.6}$—$Ti_{2.3}$—$B_{0.9}$—$N_{13}$, for example) is −0.06%/K which is negative and large as compared to the conventional magnet (close to 0%/K), so that the decrease of the residual magnetic flux when the ac generator is at an elevated temperature, whereby decrease in the generator power output can be alleviated.

Figure 5:
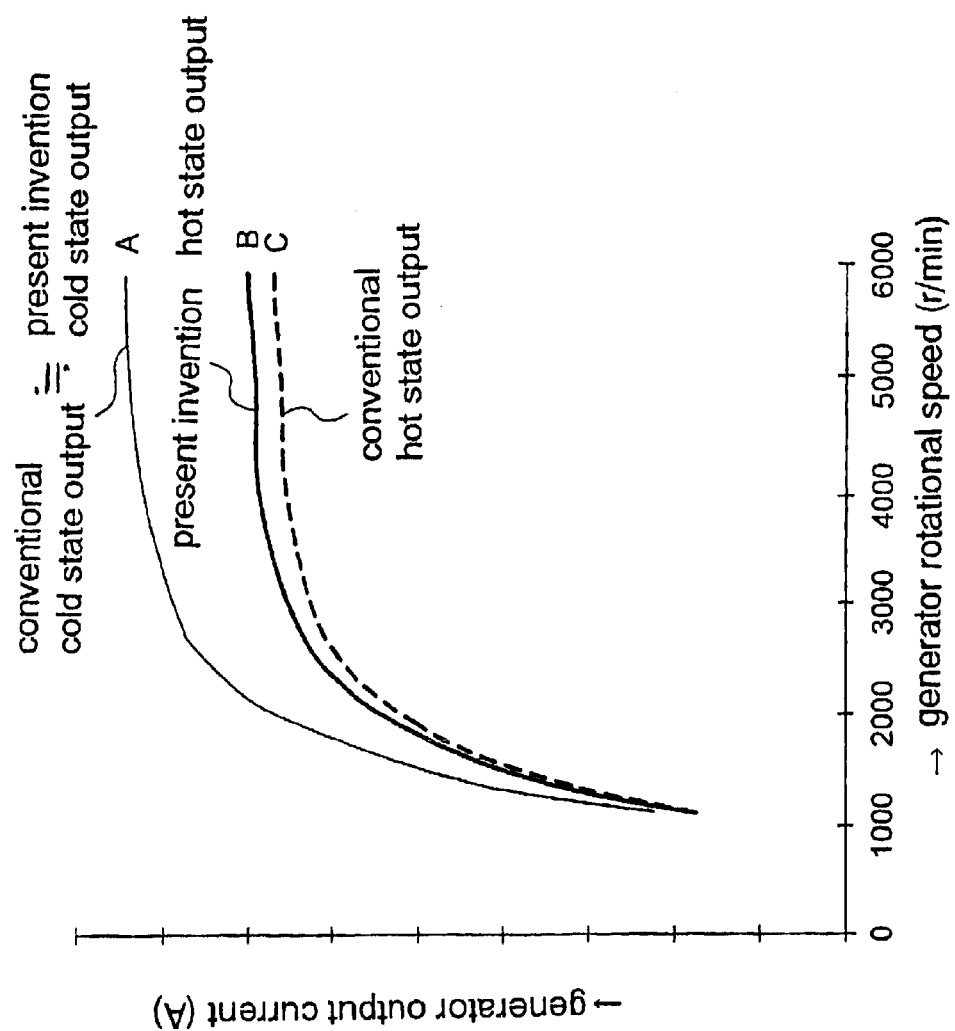
FIG. 5 is a graph showing the change in the output current as plotted against the rotational speed of the ac generator in terms of that at the cold state and the hot state in comparison with that of the conventional design.

FIG. 5 is a graph showing the change in the generator output current as plotted against the rotational speed of the ac generator (r/min.) in terms of that at the cold state (A) and the hot states (B) and (C) in comparison with that of the conventional ac generator. As apparent from the graph shown in FIG. 5, in the cold state, a curve A represents the generator output properties of the ac generator of both the present invention and the conventional design. The hot state property of the conventional generator is as shown by a curve C of an output current value lower than the curve A for the cold state output property, whereas the hot state output property of the generator of the present invention is as shown by a curve B of an output current value higher than the curve C. This is because the temperature coefficient of the residual magnetic flux density of the magnet is large in negative than that of the conventional design, which decreases the amount of decrease of the residual magnetic flux density during the temperature rise.

From FIG. 3, it is seen that the 2-hour non-reversible demagnetizing factor (373K×2 hr) of the conventional Nd—Fe—Co—B bond magnet is −4.4% and the 300-hour non-reversible demagnetizing factor (373K×300 hr) is −5.4%. The 2-hour non-reversible demagnetizing factor (373K×2 hr) of the conventional Sm—Fe—N bond magnet is −4.0% and the 300-hour non-reversible demagnetizing factor (373K×300 hr) is −5.3%. Contrary to these conventional magnets, the 2-hour non-reversible demagnetizing factor (373K×2 hr) of the Sm—Fe—Ti—N bond magnet of the present invention is −2.1% and the 300-hour non-reversible demagnetizing factor (373K×300 hr) is −2.5%. That is, 2-hour non-reversible demagnetizing factor as well as the 300-hour non-reversible demagnetizing factor of the Sm—Fe—Ti—N bond magnet of the present invention are both about one half of those of the conventional magnet. Therefore, when the ac generator is operated at an elevated temperature, the conventional magnet is significantly deteriorated in magnetic property to decrease the output property of the ac generator form the initial property, whereas the magnetic property is deteriorated only by a small extent and the deterioration of the output property of the ac generator can be made as small as about a half of the deterioration of the conventional generator, thus resulting in a stable effect of the magnet.

Figure 6:
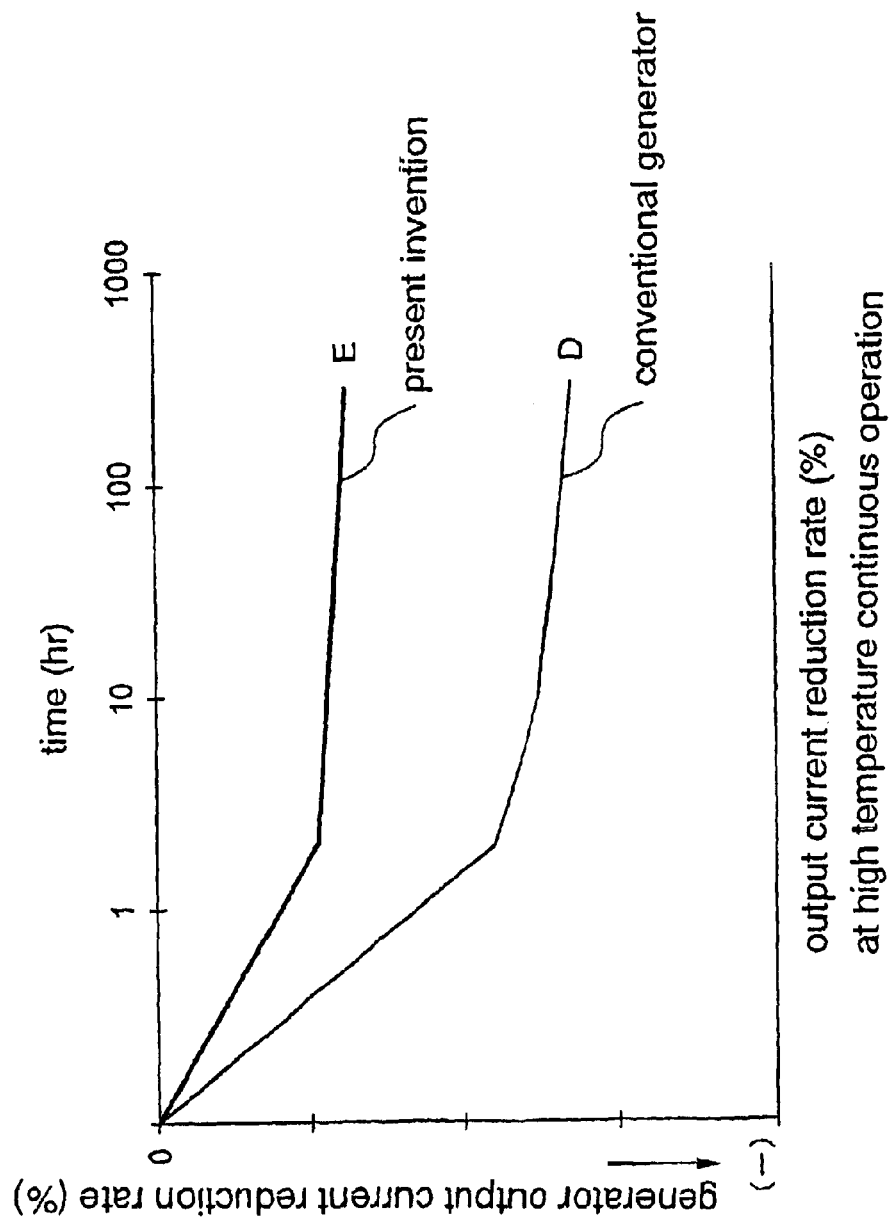
FIG. 6 is a graph showing the reduction rate in the output current as plotted against the operation time of the ac generator in terms of that at the cold state and the hot state in comparison with that of the conventional design.

FIG. 6 is a graph showing the change in the reduction rate (%) in the output current of the ac generator as plotted against the high temperature continuous operation time (hr) of the ac generator in comparison with that of the conventional generator. As apparent from FIG. 6, the curve D of the reduction rate in the conventional generator sharply decreases until about 10 hours from the initiation of the high temperature continuous operation and thereafter it gradually decreases as the elapse of time. Contrary, the decreasing rate of the output current of the generator of the present invention is as shown by a curve E from which it is seen that the reduction rate is about 50% of that of the conventional generator until a little beyond one hour from the start of the operation and that it gradually decreases as the lapse of time thereafter, whereby it can be said that the reduction rate as a whole of the output current of the generator of the present invention is about 50% of that of the conventional generator. This is because the non-reversible demagnetizing factor of the magnet of the present invention is only about one half of the conventional magnet and the deterioration of the property of the magnet due to the high temperature continuous operation is reduced to a half.

Figure 4:
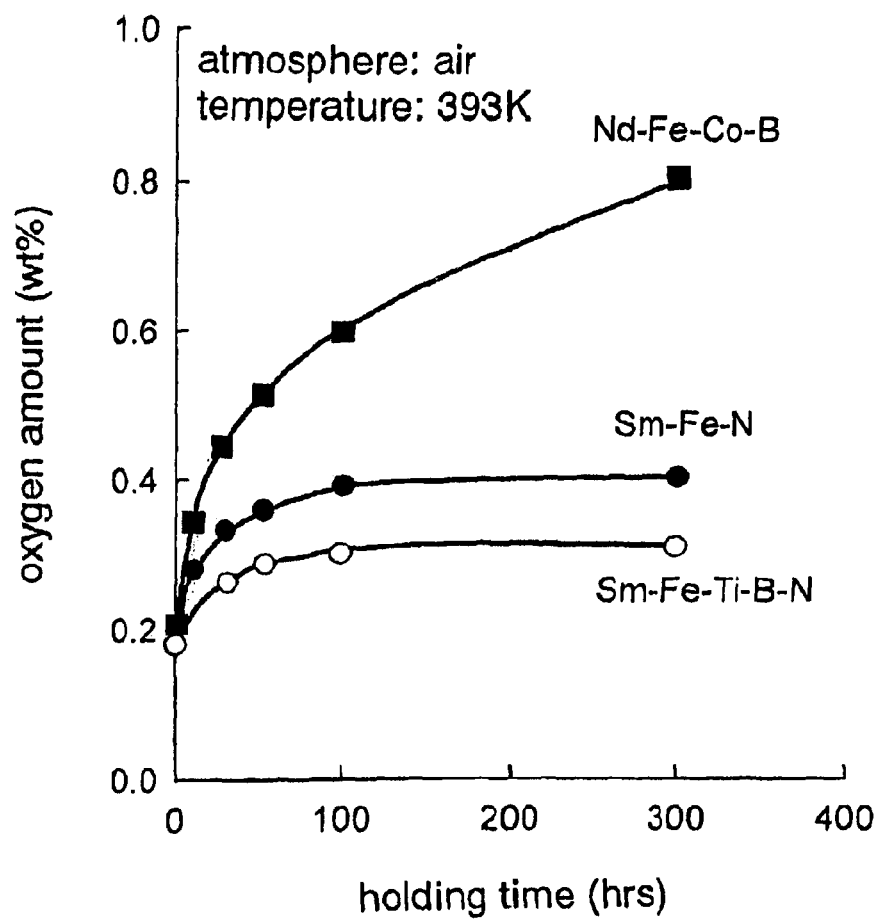
FIG. 4 is a graph showing the change in the oxygen content of the magnetic powders in relation to time.

FIG. 4 is a graph showing the change in the oxygen content of the magnetic powders in relation to time when the magnetic powder is held at an elevated temperature of 373K. As apparent from the graph of FIG. 4, the oxygen content of the conventional Nd—Fe—Co—B magnetic powder after heating (373K×300 hr) is 0.8 wt % and the oxygen content of Sm—Fe—N magnetic powder after heating (373K×300 hr) is 0.4 wt %, whereas the oxygen content of the Sm—Fe—Ti—B—N magnetic powder of the present invention after heating of 373K×300 hr is 0.3 wt %, resulting in an oxygen resistance superior to that of the conventional magnet.

Accordingly, even when some moisture enters into the generator through ventilation windows of the brackets, the magnets of the present invention do not easily generate rust, providing an ac generator superior in resistance to corrosion or environment. Also, the reduction of the cost can be achieved in comparison to the Nd—Fe—Co—B bond magnet which needs the surface treatment.

Thus, according to the ac generator of the present invention, the ac generator is increased in the output at an elevated temperature as compared to the conventional generator and superior in durability and resistance to environment and is prevented from decreasing the mechanical strength.

Figure 7:
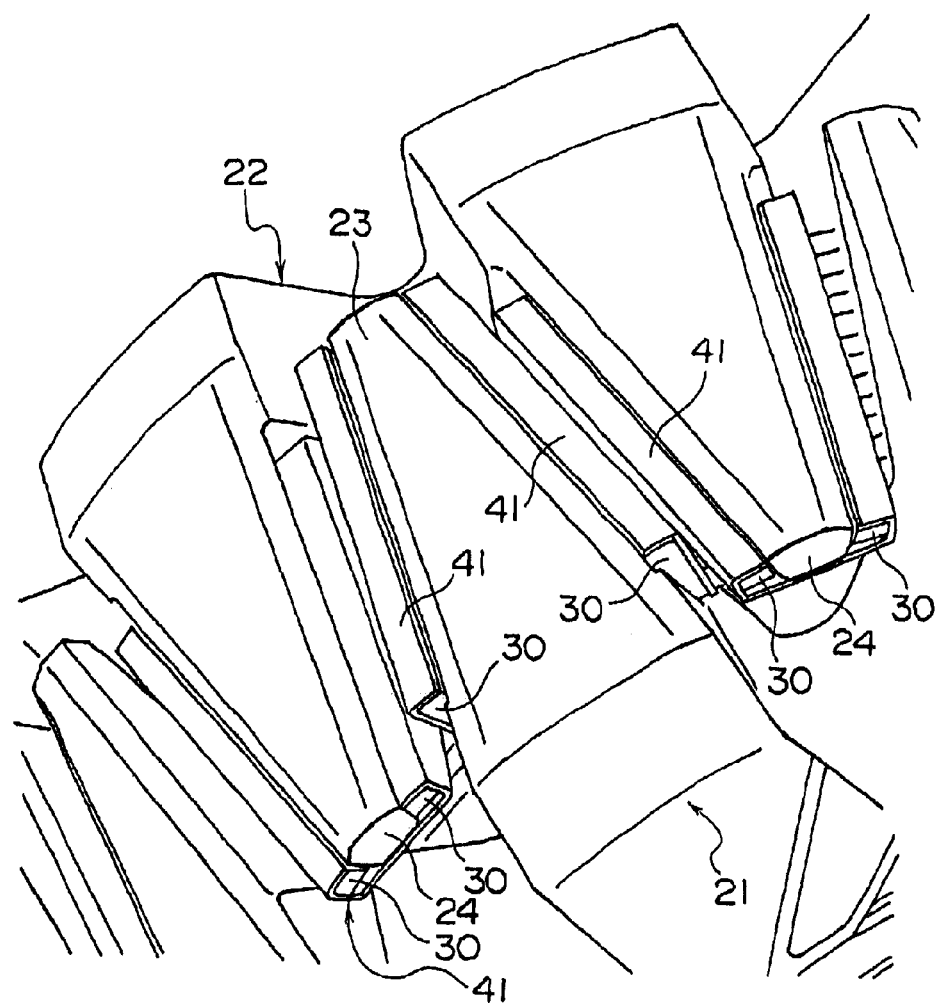
FIG. 7 is a perspective view showing the relationship between the pole core and the permanent magnets of the ac generator of one embodiment of the present invention.
Figure 8:
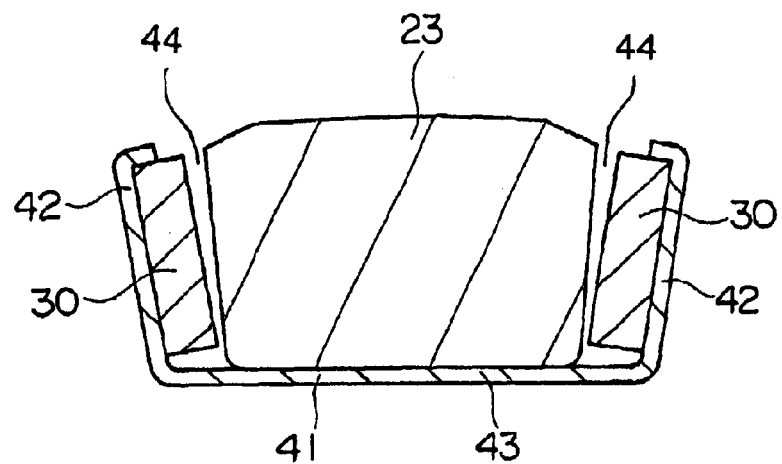
FIG. 8 is a sectional view showing the relationship between the pole core and the permanent magnets of the ac generator of the present invention.

FIG. 7 illustrates in a perspective view the permanent magnets 30 disposed between the pawl-shaped magnetic poles 23 and 24 of the pole core members 21 and 22 of the rotor of the ac generator of the second embodiment of the present invention, and FIG. 8 illustrates in a sectional view the relationship between the pawl-shaped magnetic pole 23 and the permanent magnets 30. Each of the permanent magnets 30 is the Sm—Fe—Ti—B—N bond magnet, which is secured to the holding member 41 made of a corrosion-resistant material such as a magnetic resin sheet material or a magnetic metal sheet. The holding member 41 has provided on oblique lines of the substantially trapezoidal sheet member with a substantially U-shaped bent portions 42, within which the permanent magnets 30 are attached by means of a bonding agent or the like so that each of the permanent magnets 30 are surrounded by the bent portions 42. The holding member 41 having the permanent magnets 30 secured along its oblique sides in this manner is secured by a bonding agent or the like at its central portion 43 to the inner circumferential surface of the pawl-shaped magnetic poles 23 and 24.

According to this structure, the permanent magnets 30 are surrounded by the corrosion-resistant holding member 41, so that they are protected from the surrounding environment and the corrosion-resistance inherent to the Sm—Fe—Ti—B—N bond magnet as well as the rust-resistance of the permanent magnet 30 are improved, thereby to improving the resistance to environment. Also, a mold resin material of a low thermal conductivity may be used for the holding member 41 for holding the permanent magnet 30, with a result that the output reduction at the high temperature operation can be made smaller as compared to the conventional magnet because the Sm—Fe—Ti—B—N bond magnet is superior in the thermal stability. Also, it has a good resistance to corrosion and environment, so that the decrease in strength can be prevented.

Figure 9:
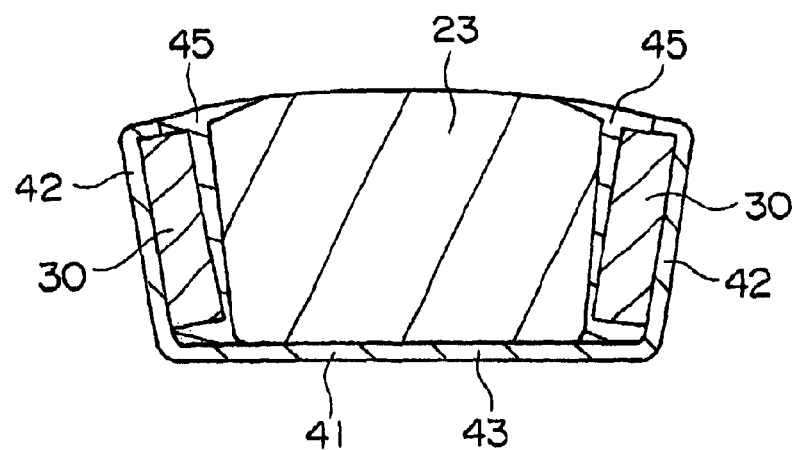
FIG. 9 is a sectional view similar to FIG. 8 showing the relationship between the pole core and the permanent magnets of the ac generator of one embodiment of the present invention.

The structure shown in FIG. 9 is similar to the structure for mounting the permanent magnets 30 to the magnetic pole 23, but is different in that magnetic resin 45 is filled within gaps 44 defined between the side surfaces of the pawl-shaped magnetic poles 23 and the magnetic pole faces of the permanent magnet 30 opposite thereto. The magnetic resin 45 close the air gaps formed by the gaps 44 and at the same time covers the exposed surface of the permanent magnets 30. According to this arrangement, the influence of the outer environment to the permanent magnets 30 can be further decreased and the resistance to rust can be further improved as compared to the embodiment shown in FIGS. 7 and 8. While the heat dissipation of the permanent magnets 30 may be deteriorated because the holding member 41 surrounding the permanent magnets 30 and the resin material filled within the gaps 44 surround the permanent magnets 30, the Sm—Fe—Ti—B—N bond magnet has a superior thermal stability, so that the output reduction at a higher temperature operation is made smaller as compared to the conventional magnet. Also, it has a good resistance to corrosion and environment, so that the decrease in strength can be prevented.

Figure 10:
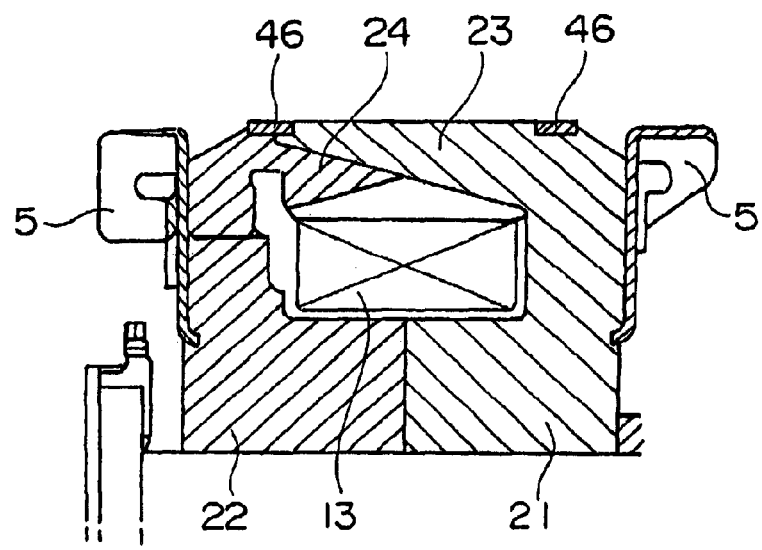
FIG. 10 is a sectional view showing the relationship between the pole core and the restriction member of the ac generator of the present invention.
Figure 11:
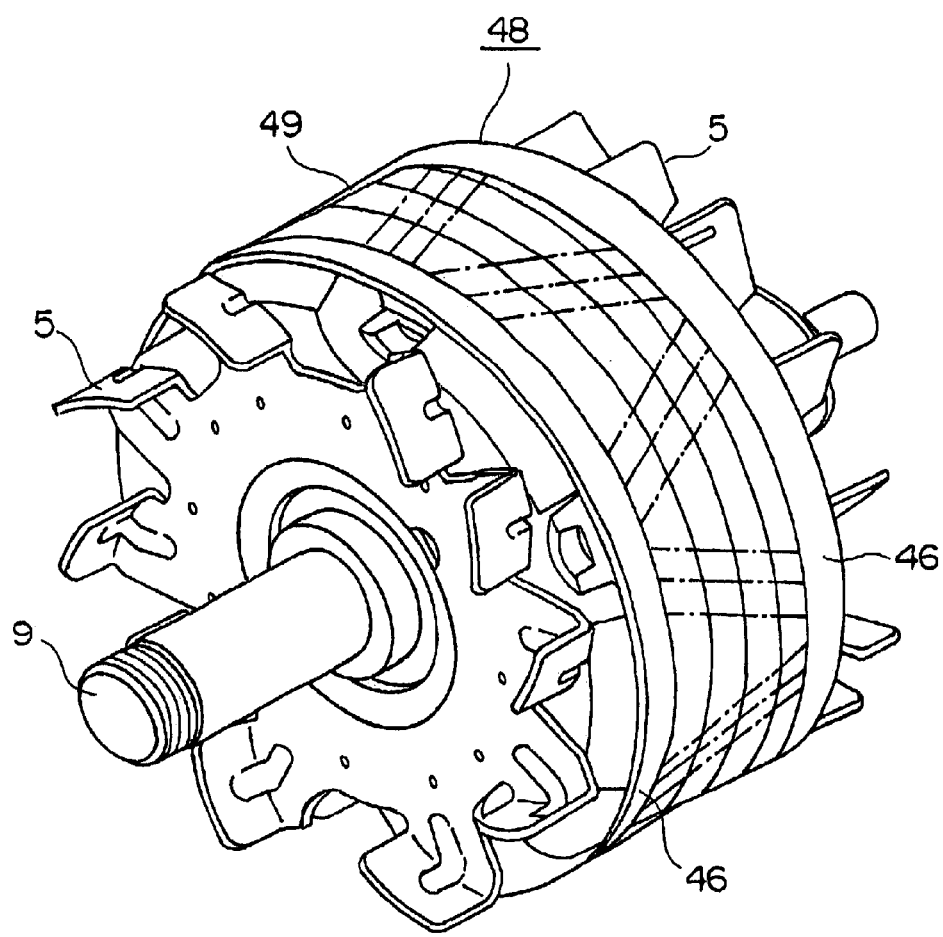
FIG. 11 is a perspective view showing the tape wound on the rotor of the ac generator of one embodiment of the present invention.

In the ac generator illustrated in FIGS. 10 and 11, restriction members 46 in the shape of annular belts are fitted on the tip portions and the root portions of the magnetic poles 23 and 24 of the first and the second pole core members 21 and 22. These annular restriction members 46 are for preventing the tip portions of the magnetic poles 23 and 24 from displacing in the radially outward direction due to the centrifugal force of the ac generator during operation. This arrangement restricts the radially outward displacement of the magnetic poles 23 and 25 to improve the mechanical strength.

A rotor 48 of the ac generator shown in FIG. 11 comprises a tape 49 of a resin impregnated carbon fiber wound and secured on the entire outer circumference of the rotor 48 and on the pole core members 21 and 22 as well as the permanent magnets 30. The tape 49 firmly supports the pole core members 21 and 22 and the permanent magnets 30 at their outer circumferences, so that the displacement restriction function acting on the magnetic poles 23 and 24 are further improved and the permanent magnets 30 can be prevented from flying off. Also, since the rotor as a whole is covered by the corrosion-resistant tape 49, it becomes less subject to the influence of the outer environment, improving the resistance to environment.

As has been described, according to the present invention, the ac generator comprises a stator and a rotor. The stator is disposed within a bracket having an exhaust window and generating a three-phase ac current by a rotating field of the rotor. The rotor comprises a rotor coil for generating a magnetic flux, a pole core composed of first and second pole core members disposed so as to cover the rotor coil and having pawl-shaped magnetic poles projecting in staggered relationship, a plurality of permanent magnets disposed on both side surfaces of the pawl-shaped magnetic pole for reducing the leakage of the magnetic flux between the side surfaces of the adjacent pawl-shaped magnetic poles, and a fan mounted to each of opposite axial ends of the rotor for cooling a heat-generating member heated due to a generator output current. The permanent magnets are permanent magnets of samarium-iron alloy containing Ti and B (Sm—Fe—Ti—B—N magnet). Therefore, since the Sm—Fe—Ti—B—N bond magnet has a superior thermal stability, the output current reduction during the higher temperature operation of the ac generator can be decreased. Also, since it has a good resistance to corrosion and environment and since the generation of rust due to the external influence such as the ingress of moisture is difficult, the output during the high temperature operation can be improved and an ac generator superior in durability and resistance to environment can be provided.

The permanent magnets may be plastic magnets made of magnet powder bonded together by a resin, so that the magnetic powders can be protected to increase the resistance to rust and the magnets are high in toughness and mechanical strength.

The permanent magnets may be bonded magnets of $Sm_{8.2}$—$Fe_{75.6}$—$Ti_{2.3}$—$B_{0.9}$—$N_{13}$, so that they are superior in thermal stability.

The permanent magnets may be supported by corrosion-resistive holding members surrounding the magnet. By surrounding the magnets by the holding members, they can be protected from the external influence to increase the resistance to rust and the high temperature output reduction can be alleviated because of the good thermal stability of the magnets.

At least one portion of the side opposing to the pawl-shaped magnetic pole side surfaces of the permanent magnets may be resin-coated, so that the gap defined between the magnets and the side surfaces of the pawl-shaped magnetic poles are filled with the resin, whereby they can be protected from the external influence to increase the resistance to rust and the high temperature output reduction can be alleviated even when the heat dissipation is not good because of the good thermal stability of the magnets.

The permanent magnets may be independently attached to each of the magnetic poles of the first and second pole core members. When the permanent magnets are independently attached to each of the magnetic poles of the first and the second pole core members, the magnets are displaceable together with the magnetic poles of each pole core members, thus eliminating an excessive stress thereon and advantageous in mechanical strength. Also, by providing a displaceable portion, the rust is difficult to generate on this portion and if generated it will not be developed.

The first and second pole core members may have on their outer circumferences restricting means for restricting the displacement of the magnetic poles in the radial direction due to a centrifugal force during the rotor rotation. Even when the magnet strength and the bonding strength between the magnet and the magnetic pole are decreased due to the generation of rust, the magnetic poles of the pole core member are strengthened by the restricting means for restricting the displacement in the radially outward direction due to the centrifugal force during the rotation of the rotor.

The restricting means may be disposed in the vicinity of the tips of the magnetic poles of the first and second pole core members to restrict the displacement of the pole tips. The restricting means restrict the movement of the tip of the magnetic poles of the pole core member at which the displacement is the largest, so that the displacement suppressing effect is large.

The restricting means may be a corrosion-resistant annular member circumferentially extending over the entire circumference of the rotor. Therefore, it has the effect of suppressing the displacement of the magnetic poles as well as the effect of suppressing the flying out of the place of the magnets. Also, by providing a corrosion resistant member surrounding the entire circumference, the rotor is less subject to the external influence and is improved in environment resistance.

What is claimed is:

1. An ac generator comprising a stator and a rotor:

said stator being disposed within a bracket having an exhaust window and generating a three-phase ac current by a rotating field of said rotor; and said rotor comprising a rotor coil for generating a magnetic flux, a pole core composed of first and second pole core members disposed so as to cover said rotor coil and having pawl-shaped magnetic poles projecting in staggered relationship, a plurality of permanent magnets disposed on both side surfaces of said pawl-shaped magnetic poles for reducing the leakage of the magnetic flux between the side surfaces of the adjacent pawl-shaped magnetic poles, and a fan mounted to each of opposite axial ends of the rotor for cooling a heat-generating member heated due to a generator output current;

said permanent magnets being permanent magnets of samarium-iron alloy containing titanium (Ti) and boron (B), wherein said permanent magnets are supported by corrosion-resistive holding members, wherein resin is located between at least one side of at least one of the pawl-shaped magnetic poles and at least one of the permanent magnets, and wherein said permanent magnets are independently attached to each of the magnetic poles of said first and second pole core members.

2. The ac generator as claimed in claim 1, wherein said permanent magnets are plastic magnets made of magnet powder bonded together by a resin.

3. The ac generator as claimed in claim 1, wherein said permanent magnets are bonded magnets of $Sm_{8.2}$—$Fe_{75.6}$—$Ti_{2.3}$—$B_{0.9}$—$N_{13}$.

4. The ac generator as claimed in claim 1, wherein said first and second pole core members have on their outer circumferences restricting means for restricting the displacement of said magnetic poles in the radial direction due to a centrifugal force during the rotor rotation.

5. The ac generator as claimed in claim 4, wherein said restricting means is only disposed in the vicinity of tip portions and root portions of the magnetic poles of said first and second pole core members to restrict the displacement of said pole tips.

6. The ac generator as claimed in claim 4, wherein said restricting means is a corrosion-resistant annular member circumferentially extending over the entire circumference of said rotor.

7. An ac generator comprising a stator and a rotor:

said stator being disposed within a bracket having an exhaust window and generating a three-phase ac current by a rotating field of said rotor; and said rotor comprising a rotor coil for generating a magnetic flux, a pole core composed of first and second pole core members disposed so as to cover said rotor coil and having pawl-shaped magnetic poles projecting in staggered relationship, a plurality of permanent magnets disposed on and connected to both side surfaces of said pawl-shaped magnetic poles for reducing the leakage of the magnetic flux between the side surfaces of the adjacent pawl-shaped magnetic poles, and a fan mounted to each of opposite axial ends of the rotor for cooling a heat-generating member heated due to a generator output current;

said permanent magnets being permanent magnets of samarium-iron alloy containing titanium (Ti) and boron (B), wherein said permanent magnets are supported by corrosion-resistive holding members, wherein resin is located between at least one side of at least one of the pawl-shaped magnetic poles and at least one of the permanent magnets, and wherein said permanent magnets are independently attached to each of the magnetic poles of said first and second pole core members.

* * * * *